Feb. 14, 1956 J. J. PELOUCH 2,734,597
VEHICLE HOIST SAFETY STRUCTURE
Filed May 29, 1951 3 Sheets-Sheet 1
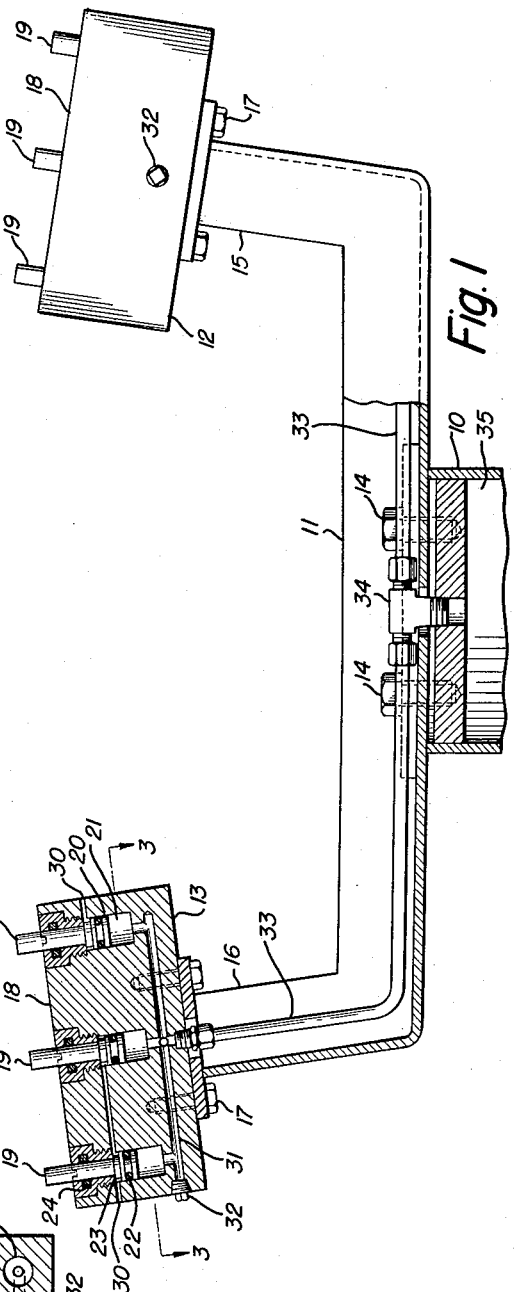
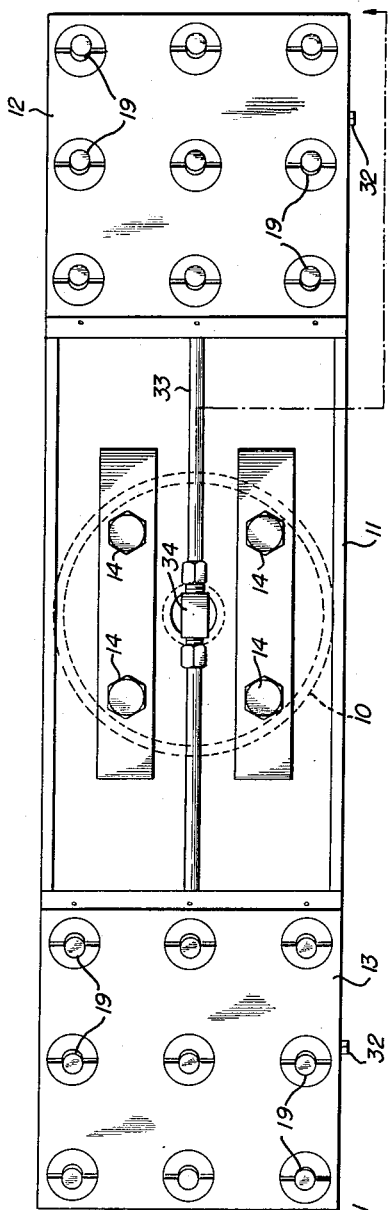
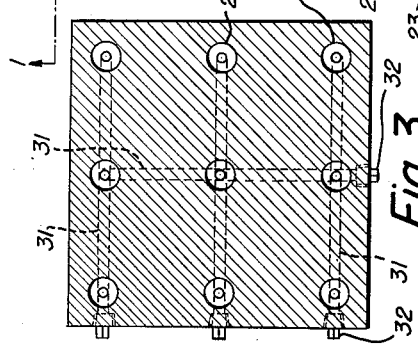
INVENTOR.
JAMES J. PELOUCH
BY
Woodling and Krost
attys

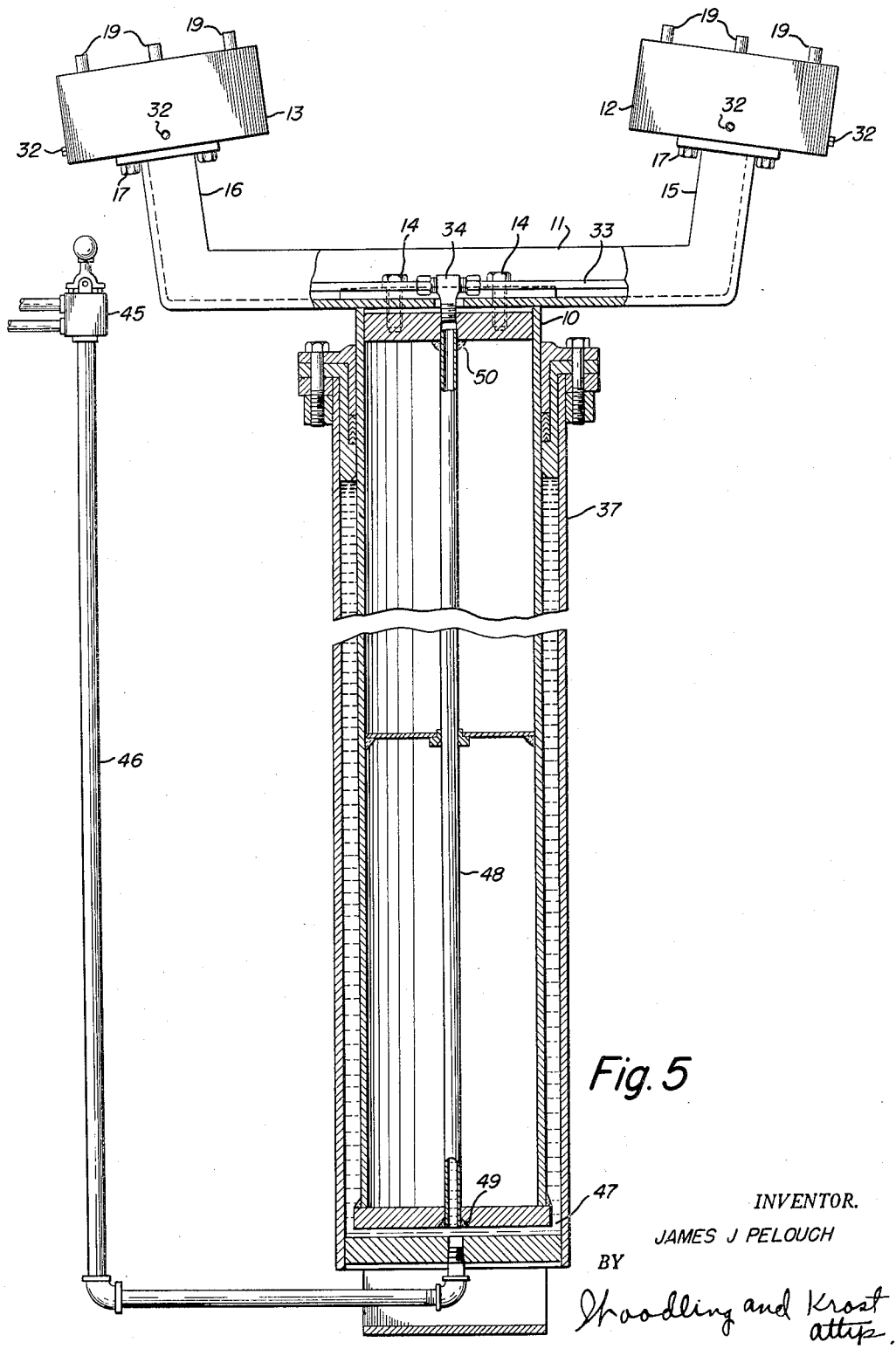

United States Patent Office 2,734,597
Patented Feb. 14, 1956

2,734,597

VEHICLE HOIST SAFETY STRUCTURE

James J. Pelouch, Cleveland, Ohio, assignor to Harold C. Schott

Application May 29, 1951, Serial No. 228,870

2 Claims. (Cl. 187—8.74)

This invention relates to vehicle lifting hoists and more particularly to a structure for preventing sidewise movement of a vehicle resting on the hoist.

It has been found that many times the vehicle will start to slide or move sidewise while it is on a vehicle lifting hoist. Generally this sidewise movement results from rocking or shaking of the vehicle while it is on the hoist. Such rocking or shaking might occur during lubrication or greasing of the vehicle. Many persons working around lifting hoists have become frightened at the sliding of the vehicle and feel that the hoist is dangerous to use since the vehicle is usually raised several feet above the ground.

This invention constitutes an improvement over the invention disclosed in my pending application Serial No. 148,060, filed March 7, 1950 for "Vehicle Holding Structure," now Patent No. 2,581,137.

An object of the invention is to provide a vehicle lifting hoist having means provided thereon for preventing sidewise movement of a vehicle resting thereon.

Another object of the invention is to provide the vehicle engagement structure with a plurality of pins urged in an upward direction against or beside the part of the vehicle resting on the engagement structure, wherein the pins may be urged upwardly either by fluid means or by electrical means.

Another object of the invention is the provision of insuring that the pins are urged upwardly against or beside the part of a vehicle resting on the engagement structure in accordance with the fluid pressure employed to raise the hoist.

Other objects and a fuller understanding of the invention may be had by referring to the following description and claims, taken in conjunction with the accompanying drawing, in which:

Figure 1 is a side elevational view of a vehicle hoist safety structure embodying the features of the invention, parts of the view being shown in cross-section to illustrate the internal parts thereof;

Figure 2 is a plan view of Figure 1;

Figure 3 is a cross-sectional view taken along the line 3—3 of Figure 1;

Figure 5 is a view similar to Figure 4, but shows the arrangement where the hoist plunger is raised by oil alone whereas the plunger in Figure 4 is raised by the combination of oil and air.

Figure 4:
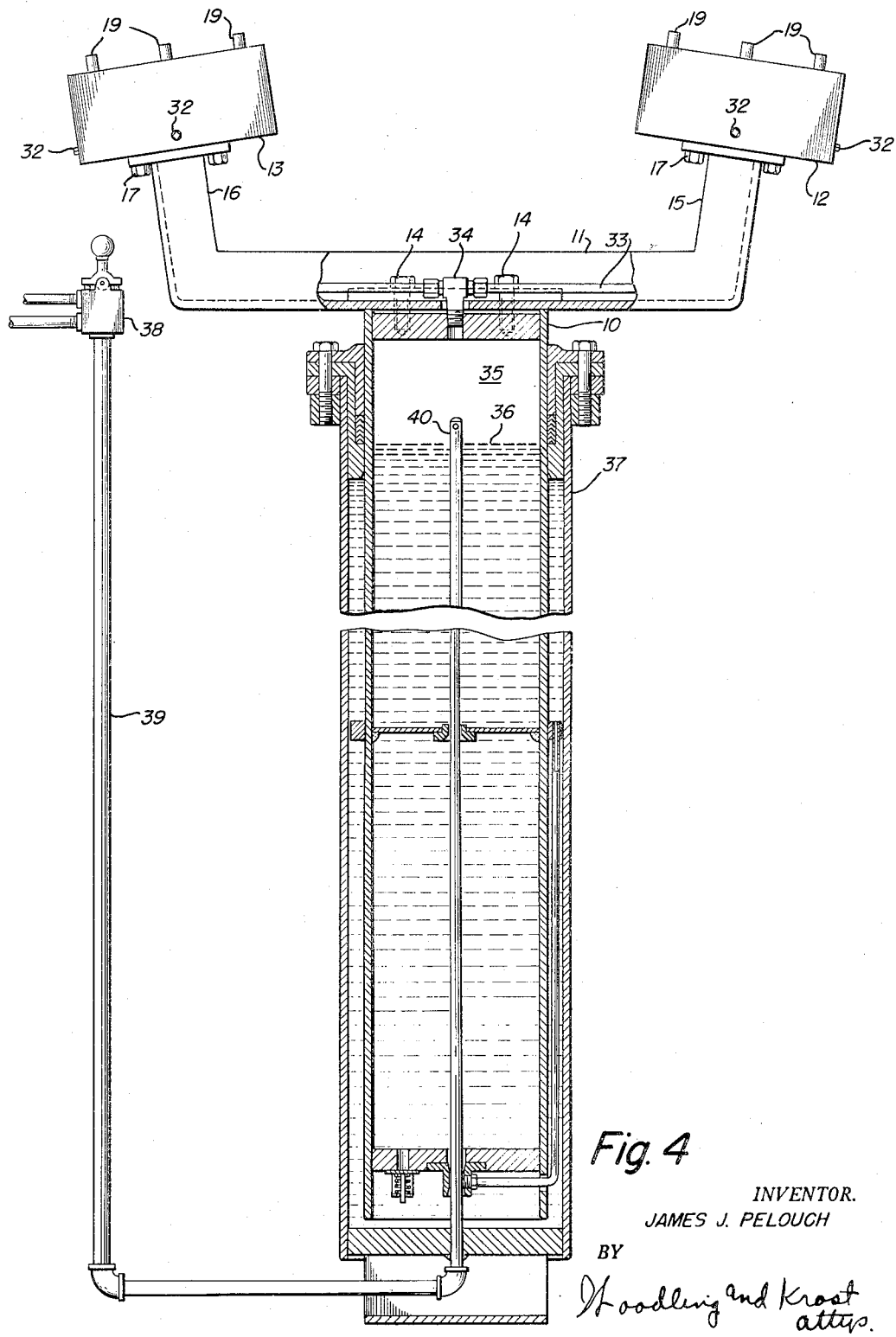
Figure 4 is a side elevational view of the vehicle hoist safety structure taken in combination with the hoist lifting plunger, parts being shown in section to illustrate the internal parts thereof.

With reference to Figures 1, 2 and 3 of the drawings, the vehicle hoist safety structure may be mounted on top of a lift post 10 of a hoist. The vehicle hoist safety structure comprises a saddle 11 having outwardly extending branches which terminate in upwardly extending ends 15 and 16. Mounted respectively upon the upwardly extending ends 15 and 16 is a vehicle engagement structure 12 and 13 which are of identical construction. The vehicle engagement structure 12 and 13 may be mounted respectively to the upper upwardly extending ends 15 and 16 by means of machine bolts 17. The saddle 11 may be mounted to the upper end of the lift post 10 by means of machine bolts 14.

The vehicle engagement structure 12 comprises a block 18 having a plurality of pins 19 extending from the upper side thereof. Each of the pins terminates at its lower end into a plunger 20 which fits within a bore 21, the plunger and bore constituting a piston and cylinder construction. Seal means 22 is provided between the plunger 20 and the bore 21 in order to make a fluid-tight chamber. Each of the pins 19 is held in place by means of a gland 24 against which a shoulder 23 on the pins abut in order to limit the outward movement of the pins. In the event that any fluid should leak past the seal means 22, the escaped fluid may flow to atmosphere through fluid escapement ducts 30. As illustrated in Figures 1 and 3, the block 18 is provided with a plurality of fluid feed ducts 31 which may be provided in the block by cross-drilling, having their outer ends blocked off by fluid plugs 32. As illustrated in Figure 1, the fluid feed ducts 31 are connected in communication to the inside fluid chamber 35 of the lift post 10 by means of fluid feed pipes 33. The fluid feed pipes 33 at their lower ends are connected to a pipe fitting 34 which is in fluid communication with the upper end of the fluid chamber of the lift post 10.

With reference to Figure 4 of the drawing, the lift post 10 is adapted to be raised and lowered within a cylinder 37 which is filled with oil up to the oil level line 36. The raising and lowering of the lift post 10 is controlled by a fluid control valve 38 which admits air under pressure through a fluid feed conduit 39 and a fluid standpipe 40 within the hollow lift post 10. As air is admitted to the upper chamber 35 in the lift post 10, the air under pressure in combination with the oil operates to raise the lift post 10. As air is admitted to the fluid chamber 35 of the lift post 10, this same air is transmitted through the fluid feed pipes 33 to the vehicle hoist safety structure mounted on the upwardly extending ends 15 and 16 of the saddle 11. The air under pressure raises the plungers 20 within the bores 21 which elevates the plurality of pins 19 in an upward direction against or beside the part of the vehicle resting on the engagement structure.

The operation of the lift post 10 in Figure 4 is the same as that shown and described in my pending application Serial No. 164,639, filed May 27, 1950 for "Air Bleeder for Vehicle Lifts." The combination in Figure 4 gives the operator complete assurance that the moment that the air control valve 38 is operated to raise the lift post 10, that at the same time air is transmitted to the plungers 20 for raising the pins 19 in an upward direction against or beside the part of the vehicle resting on the engagement structure. This prevents the vehicle from sliding sidewise off of the vehicle engagement structure 12, because the raised pin which is beside the part of the vehicle resting on the engagement structure prevents the vehicle from sliding sidewise. Those pins which are beneath the part of the vehicle resting thereon are merely pushed downwardly in their respective bores. Accordingly, the combination provides a safety structure which is automatic in its control to guarantee that the pins 19 are always urged upwardly by the pressure of the air which raises the lift, so that there is no danger or fear that the vehicle will slide sidewise off of the vehicle engagement structure 12 mounted upon the two ends of the saddle 11.

In Figure 5 I show a modified arrangement of mounting the vehicle hoist safety structure on top of a lift post 10 which is operated completely by oil instead of the combination of oil and air as shown in Figure 4. In Figure 5, oil under pressure is admitted to the lower cylindrical chamber 47 by operation of the control valve 45 whereupon oil flows through the feed conduit 46 into the lower cylindrical chamber 47, whereupon the oil pressure raises the lift post 10 within the cylinder 37. Interconnecting the pipe fitting 34 and the bottom of the lift post 10 is an interconnecting pipe 48 whereby oil under pressure within the cylindrical chamber 47 is admitted to the fluid feed pipes 33 for actuating the plungers 20 which raise the pins 19. The interconnecting pipe 48 may be welded at its upper end at the welds 50 to the upper end of the lift post 10 and the lower end of the interconnecting pipe 48 may be welded at the weld 49 to the lower end of the lift post 10.

Accordingly, when the valve 45 is operated to admit fluid or oil under pressure to the lower end of the lift post 10, the same oil pressure is transmitted to the plungers 20 for raising the pins 19 in an upward direction against or beside the part of the vehicle resting on the engagement structure. This gives complete assurance that the pins are urged upwardly the moment that oil under pressure is transmitted to the bottom end of the lift post to raise same.

It is to be observed that in all of the arrangements shown herein, the pins which prevent the vehicle from sliding off sidewise are urged upwardly in response to a control which governs the raising and lowering of the lift post. In other words, all of the guess work is removed from the operation of the pins so that the operators who work around the hoist have complete confidence that the pins are always urged upwardly to make certain that those pins which are beside the part of the vehicle resting on the engagement structure are always positively operated to give complete safety.

It is to be noted that the pins are always urged upward even when the lift post 10 is descending because the weight of the vehicle and the lift post 10 create a pressure of such value as to keep the pins in a raised position. However, when the control valve of any of the forms of invention is closed to cut off air or oil pressure from the lift post and the post, the pressure is also relieved from the pin chambers 21 allowing the pins to lower by gravity or spring action to retract and release their engagement with the underparts of the vehicle.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a vehicle hoist having a lift post, a pressure chamber by which said post is raised and lowered, a vehicle engagement structure for engaging and lifting a part of a vehicle, said structure being carried by said lift post and comprising a body member having a laterally disposed upper surface, said body member having a plurality of pin chambers laterally spaced from each other, a pin having its lower end slidably mounted in each said chambers and having an upper end extendable to a position above said top surface of said body member beside a part of a vehicle resting upon said engagement structure to prevent shifting of said vehicle while hoisted, control means to control elevation and lowering of said lift post and vehicle engagement structure, fluid pressure means responsive to the operation of said control means and communicating said pressure chamber and said pin chambers for applying a lifting force to each pin with a force of low intensity insufficient to lift said vehicle, and said last-named means including means communicating said control means and each of said pin chambers for individually and collectively applying a lifting force to said pins.

2. A vehicle hoist having a lift post, a pressure chamber by which said post is raised and lowered, a vehicle engagement structure for engaging and lifting a part of a vehicle, said structure being carried by said lift post and comprising a body member having a laterally disposed upper surface, said body member having a plurality of piston chambers carried spaced from each other, said body member having a plurality of passages interconnecting said piston chambers and said pressure chamber, a piston slidably mounted in each piston chamber and having an upper end extendable to a position above said top surface of said body member beside a part of a vehicle resting on said engagement structure to prevent shifting of said vehicle while hoisted, fluid pressure means for operating said lift post to cause elevation and lowering of said vehicle engagement structure, and said fluid pressure means having a conduit communicating said intercommunicating passages with said pressure chamber for applying a lifting force to each piston to extend those pistons which are not retarded by engagement with a vehicle part with a force of low intensity insufficient to lift said vehicle.

References Cited in the file of this patent

UNITED STATES PATENTS

| | | |
|---|---|---|
| 2,053,368 | Hott | Sept. 8, 1936 |
| 2,337,573 | Schultz | Dec. 28, 1943 |
| 2,581,137 | Pelouch | Jan. 1, 1952 |